United States Patent [19]

Crosby

[11] 3,742,469

[45] June 26, 1973

[54] HALF-TURN WORD LINE RETURN FOR PLATED-WIRE MEMORY ARRAY

[75] Inventor: Clinton D. Crosby, Minneapolis, Minn.

[73] Assignee: Sperry Rand Corporation, New York, N.Y.

[22] Filed: Apr. 4, 1972

[21] Appl. No.: 240,915

[52] U.S. Cl.340/174 DC, 340/174 PW, 340/174 TF, 340/174 VA

[51] Int. Cl. .......................... G11c 11/14, G11c 7/02

[58] Field of Search ............... 340/174 QB, 174 DC, 340/174 PW, 174 TW, 174 TF

[56] References Cited

UNITED STATES PATENTS

| | | | |
|---|---|---|---|
| 3,307,160 | 2/1967 | Young | 340/174 QB |
| 3,553,648 | 1/1971 | Gorman et al. | 340/174 PW |
| 3,173,132 | 3/1965 | Bobeck | 340/174 QB |
| 3,290,512 | 12/1966 | Tellman et al. | 340/174 PW |
| 3,641,520 | 2/1972 | Shaheen | 340/174 PW |

*Primary Examiner*—Stanley M. Urynowicz, Jr.
*Attorney*—Kenneth T. Grace et al.

[57] ABSTRACT

A plated-wire memory system tunnel structure and method of operation are disclosed. The tunnel structure is comprised of a planar insulative base member having a plurality of tunnel-oriented plated-wire memory elements passing therethrough. On one planar surface of the base member there is formed a comb-like copper member of alternately relatively-narrow return lines and interstitial relatively-wide word lines. In operation, the word current flows down the one selected word line, splits and returns back to ground through the parallel grounded return lines. The return current flowing back through the two return lines that are adjacent to the one selected word line provide a net word drive field that is substantially uncoupled from the next two adjacent work lines providing minimum disturb pulse effects thereon.

3 Claims, 4 Drawing Figures

PATENTED JUN 26 1973

3,742,469

SHEET 2 OF 2

HALF-TURN WORD LINE RETURN FOR PLATED-WIRE MEMORY ARRAY

BACKGROUND OF THE INVENTION

The present invention relates in general to magnetic memory arrays for data processing equipment and in particular to tunnel structures for plated-wire memory arrays. Such plated-wire memory arrays generally include a plurality of parallelly aligned plated wires, each of a beryllium-copper base of 0.0050 inch diameter with a 10,000A (angstrom) coating of 81% Ni-19% Fe, that are inductively coupled to a plurality of parallelly aligned copper word lines, each of 0.0014 inch thick and 0.050 inch wide copper sheet, that are orthogonally oriented with respect to the sandwiched plated-wire bit lines. A coincident coupling of the desired current amplitude of a first or of a second and opposite polarity to the selected plated-wire bit line and of the desired drive current amplitude of a first polarity to the slected word line sets the magnetization of the selected plated-wire bit lines in the areas of the superposed selected word line in a first or a second and opposite circumferential direction representative of the storing of the binary 1 or 0 at the plated-wire bit line, word line intersection-forming-memory-elments. Coupling of the desired drive current amplitude of a first polarity to the one selected word line induces in the associated plated-wire bit lines signals that are indicative of the information content of the respectively associated memory elements.

Packaging of the plated-wire memory array generally consists of an insulative base member having a plurality of parallelly arranged holes or tunnels therethrough in which are passed the plated-wire bit lines. A plurality of parallelly arranged word lines are then formed on one or both surfaces of the base material for forming half-turn or full-turn word lines, respectively, and are orthogonally oriented with respect to the bit lines. The bit lines are loosely constrained by the tunnels, thus imposing no stress inducing magnetic effects upon the plated-wire bit line, while achieving the desired bit line to word line orientation. Some typical plated-wire memory structures are exemplified by the Madea U.S. Pat. No. 3,460,113 and the Michaud, et al., U.S. Pat. No. 3,538,599.

SUMMARY OF THE INVENTION

The present invention is directed toward an arrangement of half-turn word lines in a plated-wire memory system tunnel structure and the method of operation of the resulting structure. The tunnel structure is comprised of a planar insulative base member having a plurality of parallel tunnels or holes that pass therethrough and that are oriented parallel to the two planar surfaces. A plated-wire bit line memory element is then oriented within each tunnel. On one planar surface of the base member there is formed a comb-like copper member whose parallel teeth are oriented orthogonal to the tunnels and form alternately relatively-narrow return lines and relatively-wide word lines. The intersection of each plated-wire bit line memory element and the superposed word line form a memory address for storing binary information in the superposed plated-wire memory element portion. Upon driving a current signal down the one selected word line the word drive current signal splits in the comb base and returns back along the adjacent return lines. Because of the opposing directional flow of the drive current in the word line and in the two adjacent return lines the net magnetic field about the one selected word line is substantially limited to the one selected memory element address and does not generate deleterious disturb fields in areas of the memory addresses along the adjacent word lines.

DESCRIPTION OF THE PREFERRED EMBODIMENT

Figure 1:
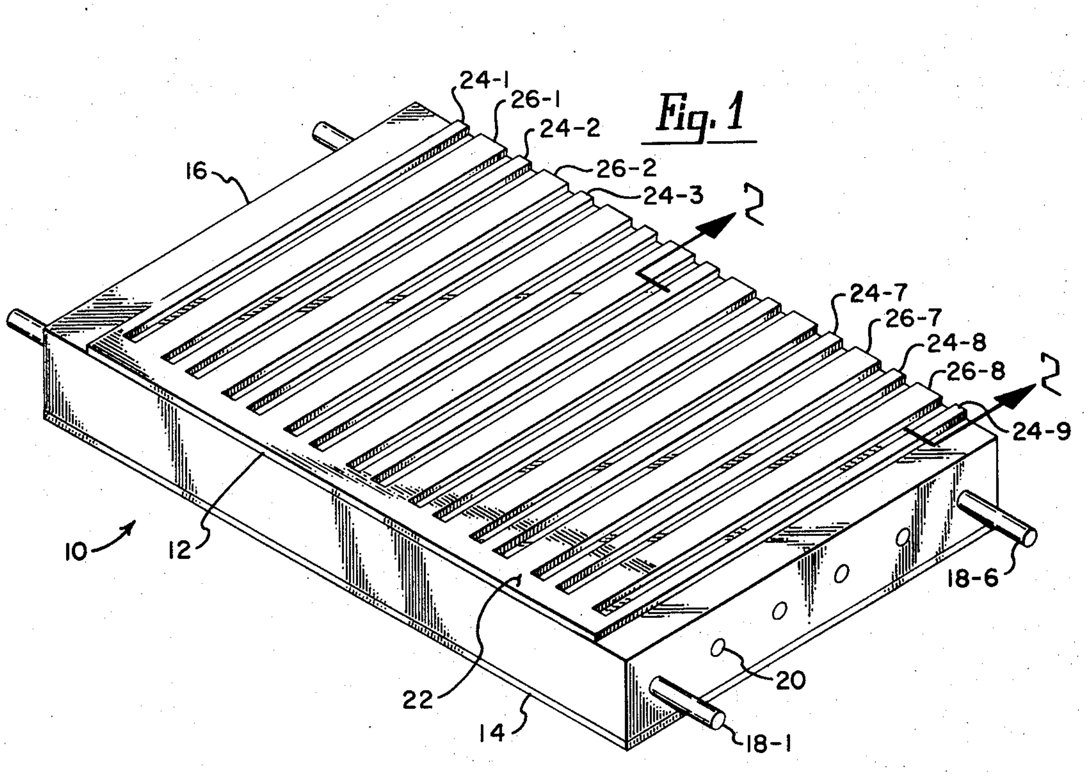
FIG. 1 is an isometric view of the plated-wire memory array of the present invention.

With particular reference to FIG. 1 there is presented an isometric view of the preferred embodiment of a plated-wire memory array incorporating the novel word line, return line configuration of the present invention. Array 10 is comprised of an integral tunnel structure formed by printed circuit members 12, 14 formed upon the opposing planar surfaces of the insulative base member 16. A plurality of plated-wire bit lines 18 are loosely constrained within the corresponding tunnels 20. In the illustrated embodiment, copper layer 14 is a continuous sheet member for forming a ground plane while copper member 12 is a comb-like member having a base element 22 running parallel to the tunnels 20 and a plurality of orthogonally-extending parallel-running relatively-narrow return lines 24 and interstitial relatively-wide word lines 26. Insulative base member 16 is preferably comprised of a polymide film such as Kapton H-film of 0.010 inch thickness having a plurality of tunnels 20 of 0.0070 inch diameter passing therethrough. Conductive layers 12, 14 are preferably one ounce copper (0.0014 inch thick) sheet affixed thereto. Formed in sheet 12, by well-known means, are word lines 26 of 0.030 inch width on 0.050 inch center-to-center spacing while return lines 24 are of 0.015 inch width spaced equally between adjacent word lines 26 with base element 22 being of 0.030 inch width.

In operation, the parallel word lines 26 and the orthogonally arranged parallel bit lines 18 form a unique memory address at each word line, bit line intersection in the superposed portion of the bit line.

Figure 2:
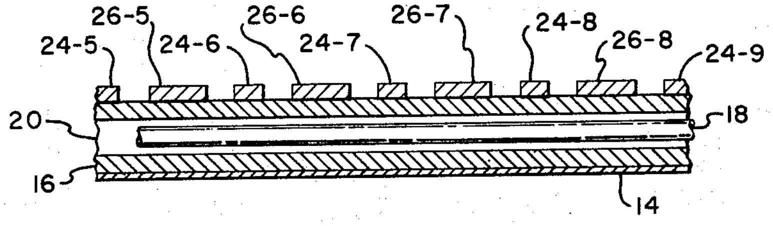
FIG. 2 is a cross-section of the memory array of FIG. 1 taken along line 2—2.

With particular reference to FIG. 2 there is presented a cross-section of the memory array of FIG. 1 taken along line 2—2. FIG. 2 is presented to illustrate the manner in which the word lines 26 and the return lines 24 and the ground plane 14 sandwich the memory elements 18 therebetween.

Figure 3:
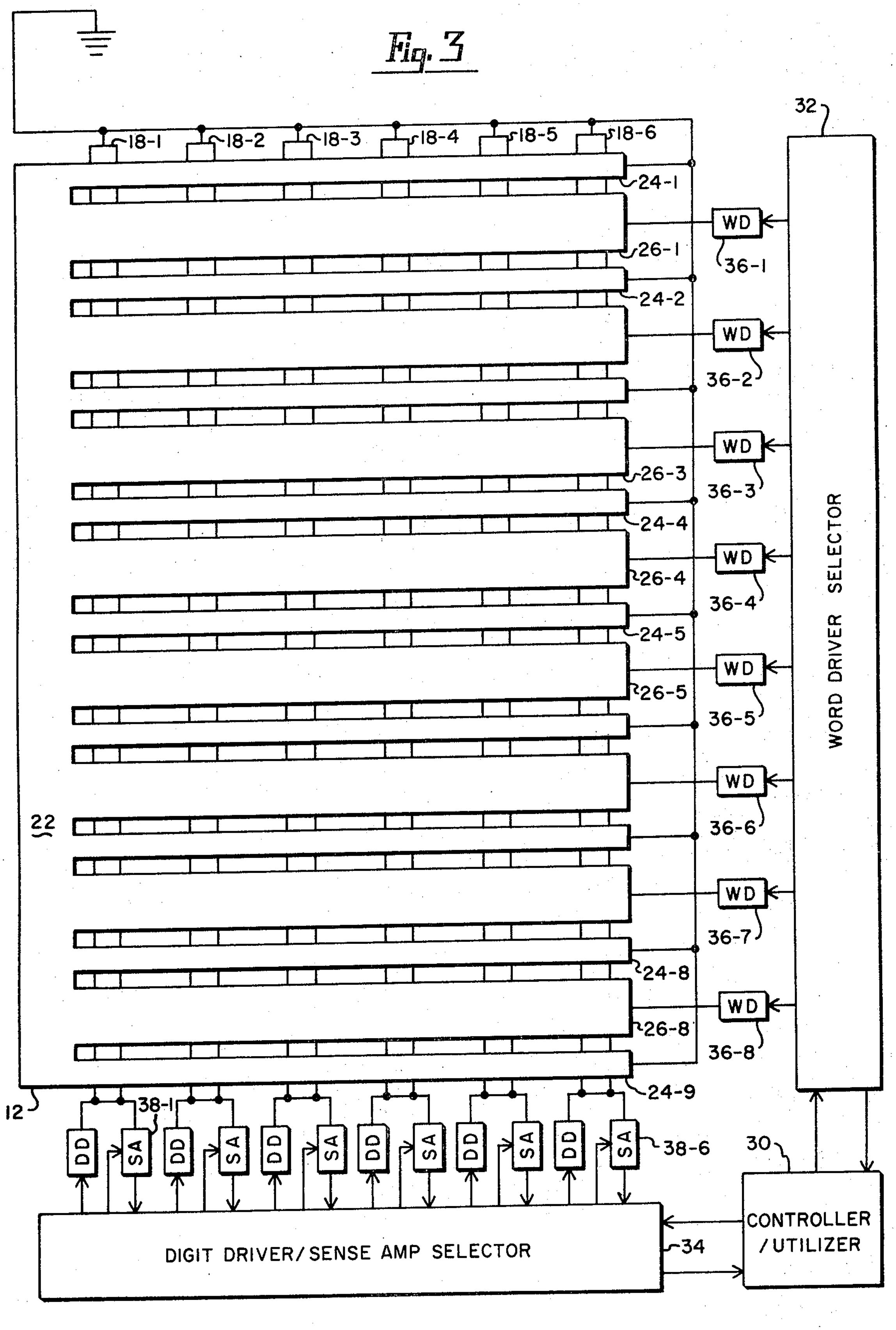
FIG. 3 is a block diagram of a plated-wire memory system for operating the tunnel structure of the present invention.

With particular reference to FIG. 3 there is presented a block diagram of a plated-wire memory system for operating the tunnel structure of the present invention. In this illustration, only layer 12 and the plated-wire bit lines 18 of the plated-wire memory array 10 of FIG. 1 are illustrated for clarity. In this embodiment, controller-utilizer 30 controls word driver selector 32 and digit driver/sense amplifier selector 34 for writing into and reading out of the memory addresses along the plated-wire bit lines 18. Selectors 32 and 34 operate in the usual manner of plated-wire memory systems:

for a write operation selector 32 couples a first polarity write current to the one selected word line 26 and then concurrently selector 34 couples a first or a second and opposite polarity write current to all the bit lines 18 for setting the magnetization of the concurrently effected memory areas of the bit lines 18 into the corresponding 1 or 0 binary state;

for a read operation selector 32 couples a first polarity read current to the one selected word line 26 and then concurrently selector 34 gates the readout signals from the bit lines 18 through the associated sense amplifier. Although the selection scheme of the embodiment of FIG. 3 is similar to that of prior art plated-wire memory systems the effect of such selection system upon adjacent memory areas, i.e., those memory areas next adjacent to the one selected memory area, is of a substantially reduced disturb effect. As an example, assume that controller 30 signals selector 32 to select word line 26–4. This is accomplished by causing word driver 36–4 to couple a first polarity read current signal to the one selected word line 26–4. This read current signal passes, from right to left, down word line 26–4 and in so doing induces the appropriate polarity readout signal in the so-affected memory areas of bit lines 18–1 through 18–6. Concurrently, selector 34 gates the associated sense amplifiers 38–1 through 38–6 permitting the appropriate polarity current signal to be recognized by selector 34, and controller 30.

Concurrently with the first polarity read current signal passing down word line 26–4 such current signal in the area of base element 22 splits and returns through the parallel-coupled return lines 24–1 through 24–9 which are grounded at their right-hand end. Because of the resistive effect of copper layer 12 most of the returning drive current returns along the two next adjacent return lines 24–4 and 24–5. This opposing current flow in the return lines 24–4 and 24–5 as compared to the current flow in word line 26–4 produces an effect upon the net magnetic field about word line 26–4 that produces a substantially decreased disturb effect upon the memory arrays associated with the next adjacent word lines 26–3 and 26–5. To better understand this effect reference should be made to FIG. 4.

Figure 4:
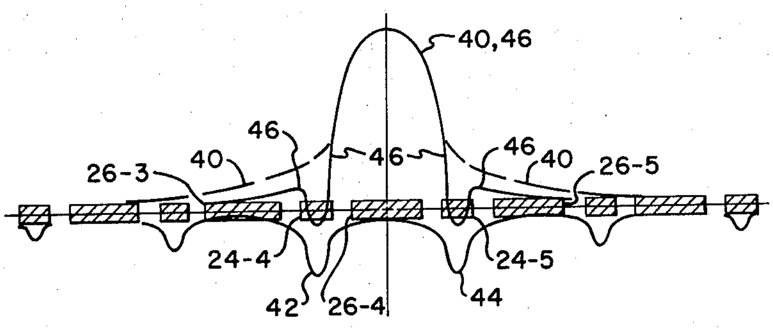
FIG. 4 is a plot of the fields provided by the tunnel structure of the present invention.

With particular reference to FIG. 4 there is presented a plot of the magnetic fields provided by the current flowing in the one selected word line and the adjacent return lines of the tunnel structure of the present invention. Assuming a current pulse coupled to word line 26–4 there is generated thereabout a magnetic field whose flux distribution may be described by curve 40. Additionally, with such current signal returning through the return lines 24–4 and 24–5 there are produced the magnetic fields represented by curves 42 and 44, respectively. Because of the opposing nature of the two return fields 42 and 44 with respect to drive field 40 there is generated a net effective field produced by the current flowing down the one selected word line 26–4 that has the contour identified by the reference numeral 46. This net field 46 in the area of the next adjacent word lines 26–3 and 26–5 is of a substantially reduced intensity as compared to the field 40 whereby such net effective field 46 has a negligible or insubstantial disturb effect upon the memory areas of the bit lines 18 associated with the word lines 26–3 and 26–5. Thus, it can be seen that applicant's novel plated-wire memory tunnel structure including the comb-like copper layer 12 with its parallel word lines 26 and interstitial return lines 24 provides an improved memory system.

What is claimed is:

1. A plated-wire memory tunnel structure, comprising:

a planar insulative base member having parallel first and second surfaces with a plurality of parallely aligned tunnels passing therebetween;

a planar continuously conductive sheet member affixed to said first surface, said conductive sheet member being a comb-like arrangement of;

a base member;

a plurality of parallel, alternate word lines and return lines orthogonally extending from said base element;

a planar conductive ground plane affixed to said second surface; means for intercoupling the otherwise open ends of all of said return lines to a common line.

2. The structure of claim 1 in which said word lines are relatively-wider than the relatively-narrower return lines for providing greater current conducting capacity in said word lines than in said return lines.

3. The structure of claim 2 in which said word lines are approximately twice the width of said return lines.

* * * * *